Sept. 20, 1932.    C. E. SWENSON    1,878,200
TRANSMISSION
Filed March 19, 1927    4 Sheets-Sheet 1
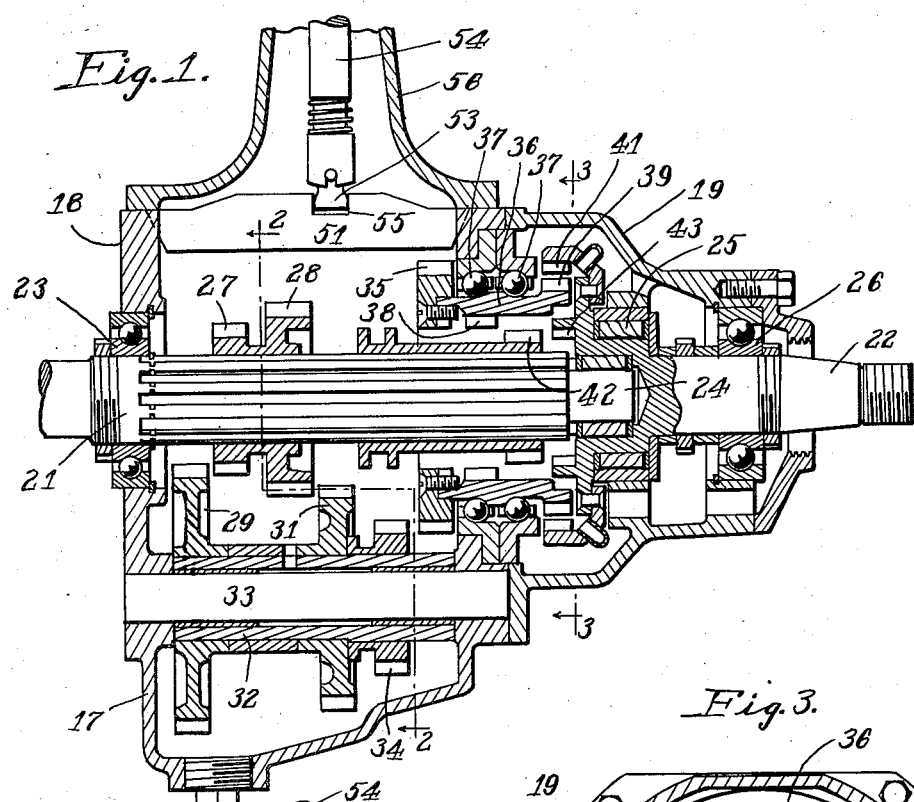
Fig.1.
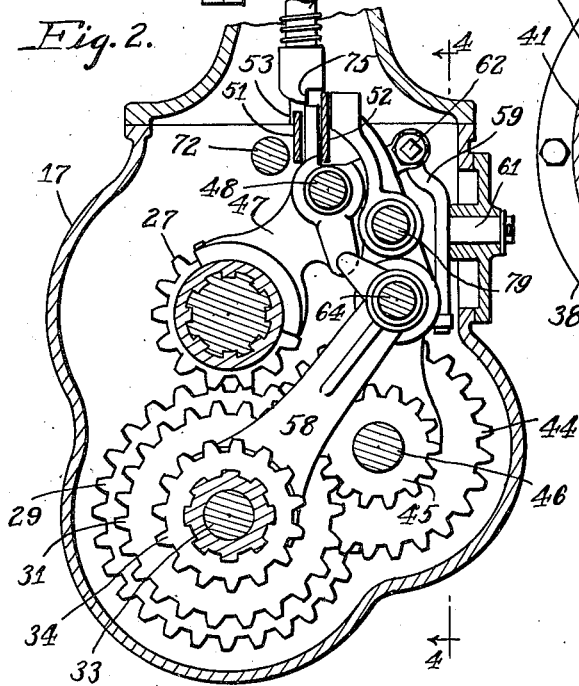
Fig.2.
Fig.3.
Inventor:
Carl E. Swenson
By Wilson & McCanna
Attys.

Sept. 20, 1932.    C. E. SWENSON    1,878,200
TRANSMISSION
Filed March 19, 1927    4 Sheets-Sheet 2
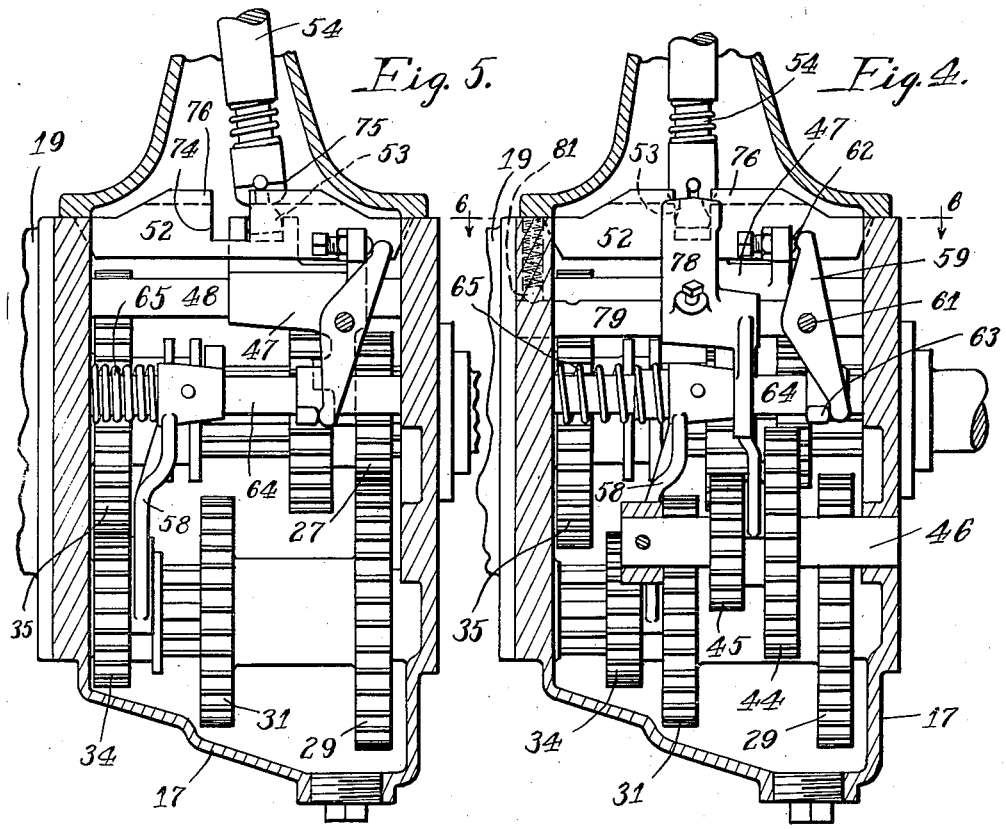
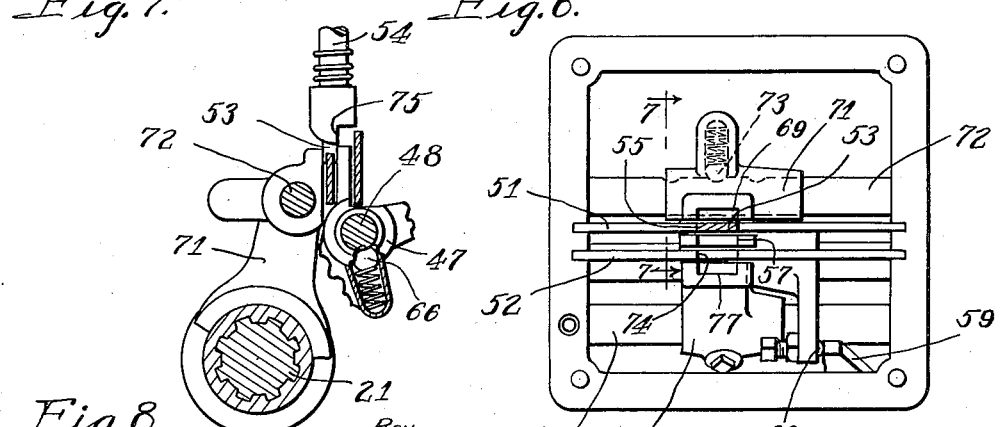
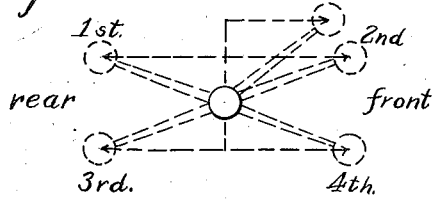
Inventor:
Carl E. Swenson
By Wilson & McCanna
Attys.

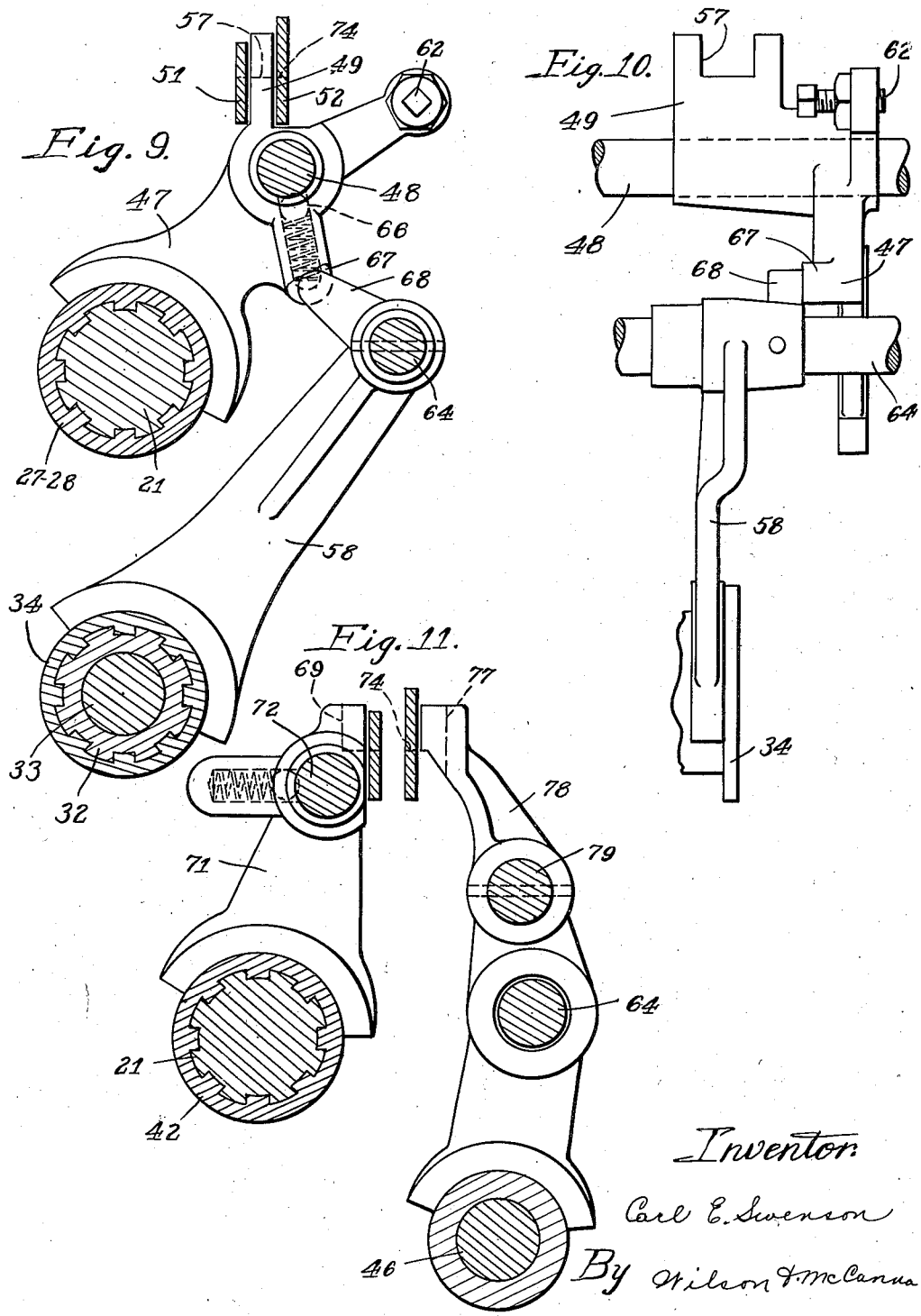

Sept. 20, 1932.  C. E. SWENSON  1,878,200
TRANSMISSION
Filed March 19, 1927   4 Sheets-Sheet 4
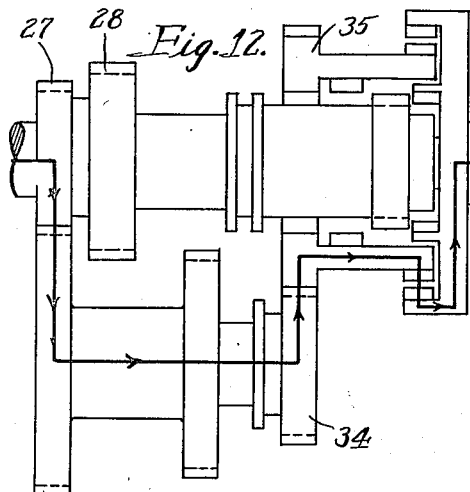
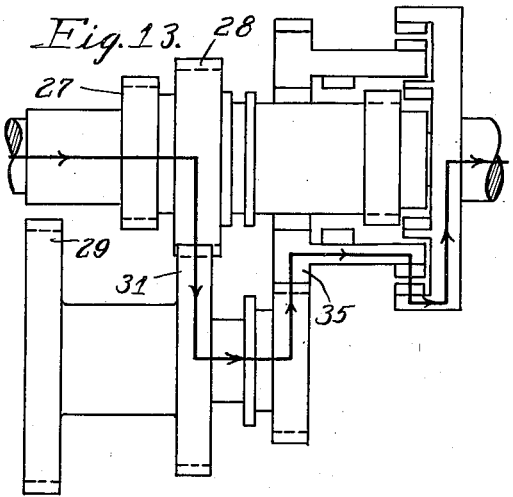
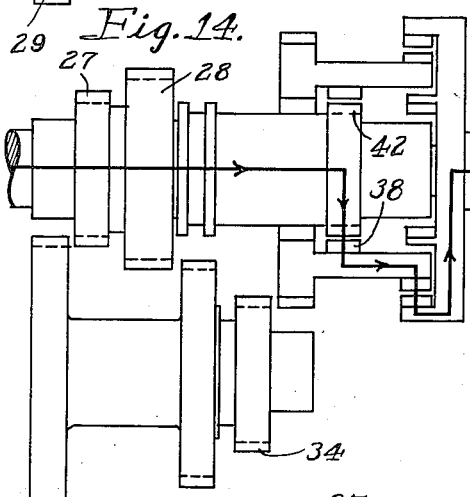
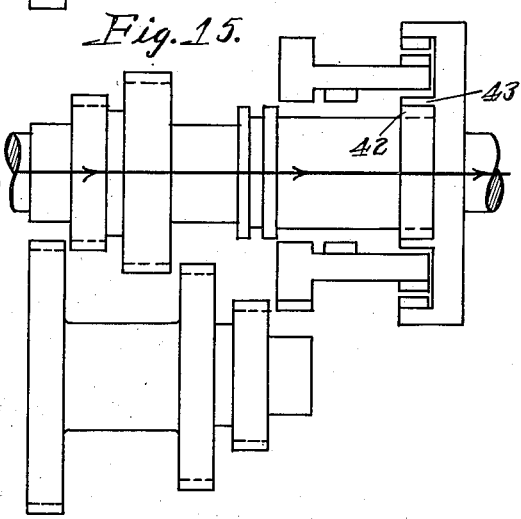
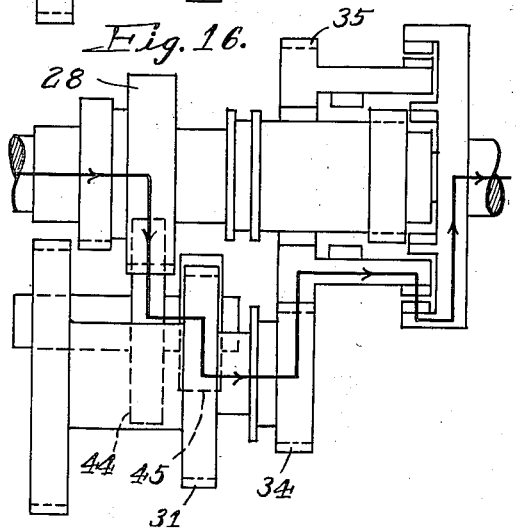
Inventor:
Carl E. Swenson
By Wilson & McCanna
Attys.

Patented Sept. 20, 1932

1,878,200

UNITED STATES PATENT OFFICE

CARL E. SWENSON, OF ROCKFORD, ILLINOIS, ASSIGNOR, BY DIRECT AND MESNE ASSIGNMENTS, TO AUTOMOTIVE RESEARCH CORPORATION, A CORPORATION OF DELAWARE

TRANSMISSION

Application filed March 19, 1927. Serial No. 176,621.

This invention relates to transmissions for motor driven vehicles and is an improvement on that disclosed in my Patent 1,764,994, granted June 17, 1930. While my invention is applicable to automobiles, trucks, tractors, and the like, either as a primary or an auxiliary transmission I have here shown it for purpose of illustration, in a form suitable as the primary change-speed transmission for a motor car.

The general objects and advantages of a transmission of the type to which the present invention relates are described in my copending application above-mentioned. The present case relates more particularly to improvements such, for example, as the provision of means whereby the counter-shaft or counter-gears remain idle during the high or direct speeds. This makes for smoother and quieter operation, especially since a motor car is used a greater amount of the time at the higher speeds. Another improvement consists in simplifying the construction, especially by reducing the number of shafts and bearings. In this particular case a more durable and satisfactory construction is obtained by an arrangement of gearing which eliminates an intermediate driven shaft shown in my prior patent. A further improvement is found in the organization of gearing whereby four speeds forward and one reverse are obtained, including three speeds through internal-external gears and including provision for disconnecting the counter-gears during the higher speeds, all in an exceptionally compact space so as to keep the transmission within given over-all length dimensions.

My invention also contemplates the provision of a new control set whereby the various gears or clutches are shifted in a novel manner to produce the desired speed changes. This control set is particularly novel in its application to the combination of gearing disclosed herein and is especially desirable and advantageous in that it follows very closely a so-called standard shift.

Other objects and attendant advantages will be appreciated by those skilled in this art as the invention becomes better understood by reference to the following description when considered in connection with the accompanying drawings, in which—

Figure 1 is a vertical longitudinal section through a transmission embodying my invention;

Figs. 2 and 3 are vertical transverse sections taken substantially on the lines 2—2 and 3—3 respectively, of Fig. 1;

Fig. 4 is a fragmentary sectional view taken substantially on the line 4—4 of Fig. 2, showing the shifter forks in the neutral position;

Fig. 5 is a similar section showing the parts shifted to the first speed position;

Fig. 6 is a plan section substantially on the line 6—6 of Fig. 4;

Fig. 7 is a section substantially on the line 7—7 of Fig. 6;

Fig. 8 is a diagrammatic view illustrating the different positions of the control lever;

Fig. 9 is an enlarged section showing two of the jointly acting shifter forks as viewed substantially on the line 2—2 of Fig. 1;

Fig. 10 is a fragmentary side elevation of said shifter forks;

Fig. 11 is an enlarged section of two other shifter forks, the operation of which will be explained hereinafter; and Figs. 12, 13, 14, 15, and 16 are diagrammatic views illustrating the first, second, third, fourth, and reverse speeds, respectively.

My improved transmission is of the type described in my patent above-mentioned which provides three speeds forward and a reverse through an under-drive internal-external gear unit and a fourth speed forward providing a direct drive without passing through gears. In other words, this transmission has two high speeds, one direct and the other through gearing, these being in addition to one or more lower change-speed ratios through gearing.

The transmission mechanism may be mounted in any suitable casing or housing structure such, for example, as a main casing section designated generally by 17 constructed for attachment at its end 18 to a motor casing or to the conventional clutch casing (not shown). To the rear end of the casing section 17 is suitably attached a casing section 19. The front and rear casing sections are, therefore, in effect, a single casing structure and may be supported in any suitable manner.

The driving shaft 21 and the driven shaft 22 are suitably journaled in the casing structure, in axial alignment, the driving shaft being supported at its forward end in a ball bearing 23 and at its rear end 24 in a pilot roller bearing in the driven shaft, and the driven shaft being supported at its forward end in a roller bearing 25 and at its rear end in a ball bearing 26. It will be noted that this transmission employs only two axially aligned shafts as compared with the three shafts in my patent, and that the driving shaft is of substantial length and supported in widely spaced bearings. A mounting of this character is advantageous since it insures proper alignment and meshing of the driving shaft gears under varying conditions in the attachment of the transmission casing to the motor or clutch casing, as will be appreciated by those skilled in this art.

In the present embodiment of my invention first and second speed driving gears 27 and 28 respectively, in integral relation, are splined on the driving shaft and adapted to be respectively shifted into and out of mesh with counter-shaft gears 29 and 31. The latter gears are, in this instance, fixed to a sleeve counter-shaft 32 supported for free rotation on a stub shaft 33 fixed in the casing 17. On the rear end of the counter-shaft 32 is splined a gear 34 adapted to be shifted into and out of mesh with a gear 35 which is fixed to an internal-external gear unit designated generally by 36. This gear unit rotates about the driving shaft 21 in eccentric relation thereto, as shown in Fig. 3, and is supported in the casing on suitable bearings such as the roller bearings 37. Said unit carries an internal gear 38 and an external gear 39 concentric with the gear 35, all three gears being concentric with respect to each other and eccentric with respect to the driving shaft 21, as clearly shown in Fig. 3. The external gear 39 is in constant mesh with an internal gear 41 fixed to the forward end of the driven shaft, as shown in Fig. 3, concentric with said shaft. A gear 42 splined on the driving shaft is adapted to be shifted into engagement either with the internal gear 38 of said gear unit or the internal gear teeth 43 fixed to the driven shaft. The gear 42 is, in effect, a clutch element or means for optionally or selectively connecting the driving shaft to the driven shaft either directly through the gear teeth 43 or indirectly by means of the internal gear 38 through the above-mentioned gear unit. Said internal-external gear unit is, in this instance, a speed reducing medium providing an under-drive through gearing, although as above-mentioned, the gears might be arranged for an over-drive. Reversing gears 44 and 45 are mounted for rotation on a fixed shaft 46 and with capacity for shifting lengthwise thereon, as shown in Figs. 2 and 4. While I have here shown sliding gears for connecting and disconnecting the different shafts and different trains of gearing it should be understood that my invention contemplates the use of any clutching means for this purpose and also contemplates, in the event that sliding gears are employed, the shifting of either of two gears adapted to be engaged or disengaged.

The train of drive for the different speeds will be readily understood by reference to Fig. 1 and the diagrammatic views, Figs. 12 to 16 inclusive. As shown in Fig. 12, by leaving the gear 42 in a neutral position and shifting the driving gear 27 into mesh with the gear 29 and shifting the gear 34 into mesh with the gear 35, the first speed forward will be produced, the train of drive being shown by the arrows. It will be noted that the power is transmitted from the driving shaft, through the counter-gears, thence through the internal-external gear unit, and thence to the driven shaft, this producing the lowest speed by reason of the ratio of the gears 27—29 and the reduction effected by the gears 29—41, a further reduction being had in this particular case by the gears 34—35. By shifting the driving gears rearwardly, as shown in Fig. 13, to disconnect the gears 27—29 and connect the gears 28—31, without disturbing the other shiftable elements, a higher speed ratio is produced, giving the second speed forward which, as in the case of the first speed, is through the internal-external gear unit. Upon returning the driving gears 27—28 and the counter-gear 34 to a neutral position, as shown in Fig. 14, and shifting the gear 42 into mesh with the internal gear 38 the third speed forward is produced. This is what I term the "low" high speed, through gearing. In this speed the counter-gears are idle, thus eliminating friction and what little gear noise there might otherwise be incidental to the idle running of these gears at a high speed. It will be here noted that the train of drive at this speed is direct from the driving shaft through the internal-external gear unit to the driven shaft. The fourth speed or direct drive is shown in Fig. 15, in which the driving gear 42 has been shifted into mesh with the gear teeth 43, thus effecting a direct driving connection between the driving and driven shafts, the counter-gears remaining idle as in the third speed. The reverse speed is effected, as shown in Fig. 16, by shifting the gears 44—45 into mesh with the gears 28 and 31 respectively and by shifting the counter-gear 34 into mesh with the gear 35, the train of drive thus being from the driving gear 28 to the reversing gears, thence through the counter-gears to the internal-external gear unit, and thence to the driven shaft.

It will be noted that in effecting certain changes in speed or direction of drive it is necessary to simultaneously shift two different gear elements and at other times a single element and that there are four shiftable elements in all and seven different gear or clutch connections to be made. It should be expressly understood that my invention is not limited to this particular combination of gears and number of shiftable elements since the present disclosure is merely for purpose of illustration. It is desired to shift all of these elements in the proper relation for producing the speeds above-described, by means of a single control lever, and it is further desired to so arrange the parts that the movements of said lever will be similar to a so-called standard control; and to obtain this result is, therefore, one of the objects of my invention.

As a single practical embodiment of the control phase of my invention, the following is provided: The driving gears 27—28 are adapted to be shifted by means of a yoke or fork 47 which is mounted to slide on a rod 48 fixed in the casing. This shifter fork has an upstanding selector part 49 disposed between two stationary guide plates 51 and 52 fixedly mounted on the casing parallel with the rod 48. These guide plates serve in part to hold the shifter fork from rotative displacement and also serve as a guide for the selector end 53 of the control lever 54 which in the neutral position is normally disposed in a transverse slot 55 in the guide plate 51. The control lever 54 is of the usual type having a ball and socket mounting on the cover plate 56, shown diagrammatically in Fig. 8, in which the usual hand grip ball at the upper end of the lever is shown in the different positions. By movement of the control lever laterally the selector end 53 may be moved from the position shown in Fig. 6 into the slot 57 in the selector end 49 in which position the lever may be moved forwardly or backwardly for shifting said fork. When this fork is moved forwardly (to the left, Figs. 1 and 13, and to the right, Figs. 4, 5, and 6) for engaging the gears 27 and 29 for the first speed, it will, by such movement, shift a fork 58 which is connected to the counter-gear 34 so as to move said counter-gear rearwardly into mesh with the gear 35. This is accomplished by means of a direction reversing lever 59, Figs. 2, 4, and 6, pivotally mounted on the casing at 61, and arranged so that its upper end is adapted to be engaged by an adjustable screw contact 62 carried by a lateral extension on the shifter fork 47 and at its lower end to actuate a lateral projection or stud 63 fixed to a rod 64 to which the shifter fork 58 is secured. Viewing Fig. 4 it will be obvious that when the fork 47 is moved forwardly (to the right) the lever 59 will be swung in a clockwise direction, thus moving the rod 64 rearwardly (to the left) the result being to move the gears 27 and 34 to the first speed position shown in Figs. 5 and 12. Although this movement compresses a coiled spring 65 confined on the shaft 64 between the housing and the shifter fork 58, the latter will, nevertheless, be retained in this shifted position by reason of the engagement of a spring pressed ball or detent 66, Figs. 7 and 9, in a holding recess in the rod 48, this detent being carried by the shifter fork 47 which is one of the moving parts in this particular motion train. Upon returning the control lever to the neutral position the gears 27 and 34 will be likewise returned, the spring 65 serving to shift the gear 34.

With the selector end 53 of the control lever still connected to the shifter fork 49 the latter may be shifted rearwardly for the purpose of moving the gear 28 into mesh with the gear 31 and the gear 34 into mesh with the gear 35. The first-mentioned gear connection will be obvious since the fork 47 is directly connected to the driving gears; and as to the second-mentioned gear connection reference may be had to Figs. 9 and 10 which show the overlapping relation of lugs 67 and 68 on the forks 47 and 58 respectively, it being noted that in the neutral position these lugs are in contact as shown in Fig. 10 and that when the fork 47 is moved rearwardly (to the left in Figs. 4 and 10) the fork 58 will be moved in the same direction. These gears will be returned to the neutral position in the same manner as described with reference to the first speed.

The third speed forward, above-referred to as the "low" high speed, is obtained by moving the selector end 53 of the control lever laterally into the recess 69 in the upstanding selector part of a shifter fork 71 (Figs. 6 and 11) which is mounted to slide on a fixed rod 72 and is connected to the gear 42 by the usual fork and groove connection, and then shifting said fork forwardly to engage its gear 42 with the gear 38. When shifting the fork back and forth between neutral and the third speed position, only the gear 42 is moved, the other gears remaining inactive in their respective neutral positions. The fork 41 is equipped with a spring-pressed ball 73 cooperating with the usual notches in the fixed rod 72 for yieldingly holding said fork in any of its three positions.

Upon shifting the fork 71 rearwardly from the neutral position the gear 42 will be connected directly to the driven shaft, thus producing the fourth speed or direct drive, shown in Fig. 15.

To obtain the reverse speed it is necessary to swing the control lever laterally to pass its selector end 53 through a transverse slot 74 in the guide plate 52. This movement is normally prevented by a movable spring-pressed collar 75 on the control lever which, when in the first and second speed position of said lever, can not move laterally to reverse position because of the top extension 76 on the guide plate 52. Upon raising the collar 75 by means of a suitable connection operable from the upper end of the control lever, as for example, to the elevated position shown in Fig. 1, the selector end 53 may be moved laterally through the slot 74 into a notch 77 in the upstanding selector end of a shifter fork designated generally by 78. This shifter fork, best shown in Figs. 4, 6 and 11, is fixed to a rod 79 and has a depending end straddling the rod 64 and having the usual forked end connected to the gears 44—45. Upon moving this fork 78 rearwardly, (to the left) Fig. 4, the gears 44 and 45 will be engaged with the gears 28 and 31 respectively, and said fork where it strikes the rod 64 will strike against the adjacent end of the collar of the fork 58 and shift the latter fork rearwardly for engaging its gear 34 with the gear 35. A spring-pressed ball 81 in the casing engages a recess in the rod 79 and yieldingly holds the forks 78 and 58 in the reverse speed position.

The diagrammatic view, Fig. 8, showing the control lever shift corresponds in position with Figs. 4, 5, and 6, it being obvious that the movement of the hand ball end of the control lever is just reverse of the shifter forks directly actuated by the selector end 53 of said lever.

The foregoing embodies all of the advantages of the transmission disclosed in my prior patent, one of the prime purposes of which was to promote the lower motor speeds and to obtain greater efficiency in fuel consumption and to minimize noise and wear. The present invention enables the application of said improvements in a more practical and durable construction and further provides for disconnecting the counter-shaft gears so that they will be idle during the high speeds. The present invention is a further improvement in the sense that a novel control is provided in which it is not necessary to move the control lever through any selected speed position in order to obtain another position; in other words, the present control is wholly selective as compared with any progressive selection and is essentially a standard shift.

It is believed that the foregoing conveys a clear understanding of my improvements and while I have illustrated but a single working embodiment it should be understood that changes might be made in the practical application thereof without departing from the spirit and scope of the invention as expressed in the appended claims.

I claim:
1. A transmission for motor vehicles comprising, in combination, a driving and a driven shaft in axial alignment, first and second speed gears on the driving shaft, first and second speed counter-gears adapted to be selectively driven by said driving gears, an internal-external gear unit in driving connection with the driven shaft, means for optionally connecting the driving shaft to the internal gear of said unit or directly to the driven shaft, and means for optionally connecting the counter gears to said internal-external gear unit.

2. A transmission for motor vehicles comprising, in combination, a driving and a driven shaft in axial alignment, first and second speed gears on the driving shaft, first and second speed counter-gears adapted to be selectively driven by said driving gears, an internal-external gear unit in driving connection with the driven shaft, means for optionally connecting the driving shaft to the internal gear of said unit or directly to the driven shaft, and means for optionally connecting the counter gears to said internal-external gear unit, the last mentioned means being operable to drive said internal-external gear unit when the first and second speed gears are engaged and not when said third and fourth speed connections are engaged.

3. A transmission for motor vehicles comprising a driving shaft and a driven shaft in axial alignment, a first and a second speed gear splined on the driving shaft, a first and a second speed counter-gear adapted to be driven by said first and second speed driving gears respectively, an internal-external gear unit, a gear fixed to the driven shaft in mesh with the external gear of said unit, a second external gear on said unit, a counter-gear rotatable with the first-mentioned counter-gears and shiftable into and out of mesh with said second external gear, means for engaging the two last mentioned gears when either the first and second speed gears are engaged for transmitting these speeds through said internal-external gear unit, and means for connecting the driving shaft either directly to the internal gear of said unit or directly to the driven shaft to effect third and fourth speeds respectively when said counter-shaft and second external gears are not engaged.

4. Change-speed gearing comprising, in combination, a driving shaft, a driven shaft and a counter-shaft, change-speed gears operable between the driving shaft and counter-shaft for driving the latter at any of different speeds, means allowing the counter-shaft to remain idle while the driving shaft is in operation, an internal-external gear unit operable between the driving and driven shafts, means for connecting the driving shaft to the driven shaft either directly or through the intermediary of said unit, and means for connecting the counter-shaft to said unit when driving through said change-speed gears and disconnecting the counter-shaft and said unit when driving through the first-mentioned means.

5. Change-speed gearing comprising, in combination, a driving, a driven and a counter-shaft, means including an internal-external gear unit adapted for connecting the driving and driven shafts and further including a shiftable means adapted for directly connecting said shafts or for connecting them through the intermediary of said gear unit, change-speed gearing operable between the driving shaft and counter-shaft, means for connecting the counter-shaft to said gear unit, and control means for connecting the counter-shaft to said unit when driving through said change-speed gears but not when driving through the first-mentioned shiftable means.

6. Change-speed gearing comprising, in combination, a driving shaft and a driven shaft in coaxial relation, a counter-shaft, change-speed gears operable between the driving shaft and counter-shaft including means shiftable for effecting changes in speed and for disconnecting said shafts, a gear unit revoluble about the driving shaft including an internal gear and a pair of external gears, a gear on the driven shaft in mesh with one of said external gears, a gear splined on the counter-shaft and adapted to mesh with the other of said external gears, and means for optionally connecting the driving and driven shafts either directly or through the intermediary of said internal gear and its unit.

7. A transmission for motor vehicles comprising, in combination, a driving and a driven shaft, a counter-shaft, optionally connectible gearing operable between the driving shaft and counter-shaft whereby the latter may remain idle at certain speeds, internal-external gearing operable between the driving and driven shafts including shiftable means for connecting the driving shaft directly to the driven shaft or for driving the latter through the intermediary of said internal-external gearing, and means for optionally connecting the counter-shaft to said internal-external gearing.

8. A transmission for motor vehicles comprising, in combination, a driving and a driven shaft, a counter-shaft, optionally connectible gearing operable between the driving shaft and counter-shaft whereby the latter may remain idle at certain speeds, internal-external gearing operable between the driving and driven shafts including shiftable means for connecting the driving shaft directly to the driven shaft or for driving the latter through the intermediary of said internal-external gearing, means for optionally connecting the counter-shaft to said internal-external gearing, and control means for simultaneously connecting the gearing between the driving shaft and counter-shaft and for connecting the latter to the internal-external gearing, and for disconnecting the counter-shaft from the internal-external gearing when the driving shaft is connected to the driven shaft either indirectly or through said internal-external gearing.

9. A transmission comprising a driving shaft and a driven shaft in coaxial relation, the driving shaft having a pilot bearing in the driven shaft, a pair of driving gears splined on the driving shaft, a pair of counter gears with which said driving gears are adapted to mesh, an internal-external unit rotatable about the driving shaft eccentric thereto and having a pair of axially spaced external gears and an internal gear, a gear rotatable with said counter gears and shiftable into and out of mesh with one of said external gears, an internal gear fixed to the driven shaft and in mesh with the other of said external gears, and a gear splined on the driving shaft and adapted to be shifted for selective connection with the driven shaft or the first-mentioned internal gear.

10. A transmission as set forth in claim 9 including means for shifting the driving gears for connection with either of the complemental counter gears and for simultaneously connecting the shiftable counter gear to the complemental gear of said unit.

11. A transmission as set forth in claim 9 including means for shifting the driving gears for connection with either of the complemental counter gears and for simultaneously connecting the shiftable counter gears to the complemental gear of said unit, and means for shifting the direct connection gear on the driving shaft for driving direct to the driven shaft or direct through said gear unit and for holding the first mentioned shiftable driving gears and the shiftable counter gear in a neutral position when said direct driving gear is engaged.

In witness of the foregoing I affix my signature.

CARL E. SWENSON.